(12) United States Patent
Kamm

(10) Patent No.: US 8,534,841 B2
(45) Date of Patent: Sep. 17, 2013

(54) 3D OPTICAL PROJECTION DEVICE

(75) Inventor: Markus Kamm, Karlsruhe (DE)

(73) Assignee: SONY Corporation, Tokyo (JP)

( * ) Notice: Subject to any disclaimer, the term of this patent is extended or adjusted under 35 U.S.C. 154(b) by 181 days.

(21) Appl. No.: 13/103,425

(22) Filed: May 9, 2011

(65) Prior Publication Data

US 2011/0285966 A1    Nov. 24, 2011

(30) Foreign Application Priority Data

May 21, 2010 (EP) .................................... 10005350

(51) Int. Cl.
*G03B 21/00*    (2006.01)

(52) U.S. Cl.
USPC .......... 353/7; 353/8; 353/20; 353/30; 353/84; 353/99; 349/9

(58) Field of Classification Search
USPC ............... 353/7, 8, 20, 30, 33, 34, 38, 84, 94, 353/98, 99, 101; 359/485.01, 487.01, 494.01, 359/618, 629, 636, 638–639, 462, 466, 475, 359/423, 434; 348/51, 54–60; 349/5, 7–9, 349/10
See application file for complete search history.

(56) References Cited

U.S. PATENT DOCUMENTS

| | | | | |
|---|---|---|---|---|
| 5,299,036 | A * | 3/1994 | Nicolas et al. | 349/9 |
| 6,594,090 | B2 * | 7/2003 | Kruschwitz et al. | 359/707 |
| 6,758,565 | B1 | 7/2004 | Cobb et al. | |
| 6,808,269 | B2 * | 10/2004 | Cobb | 353/31 |
| 7,857,455 | B2 * | 12/2010 | Cowan et al. | 353/20 |
| 7,946,717 | B2 * | 5/2011 | Abe et al. | 353/99 |
| 2004/0184007 | A1 | 9/2004 | Silverstein et al. | |
| 2004/0207823 | A1 | 10/2004 | Alasaarela et al. | |
| 2007/0132953 | A1 | 6/2007 | Silverstein | |
| 2008/0304014 | A1 * | 12/2008 | De Vaan | 353/10 |
| 2009/0128780 | A1 | 5/2009 | Schuck et al. | |
| 2009/0190095 | A1 * | 7/2009 | Ellinger et al. | 353/7 |
| 2010/0141856 | A1 * | 6/2010 | Schuck et al. | 349/9 |

FOREIGN PATENT DOCUMENTS

WO    WO 2008/141247 A1    11/2008

OTHER PUBLICATIONS

Office Action issued Sep. 27, 2012, in European Patent Application No. 11 003 993.0.
Extended Search Report issued Aug. 5, 2011 in Europe Application No. 11003993.0.

* cited by examiner

*Primary Examiner* — Georgia Y Epps
*Assistant Examiner* — Sultan Chowdhury
(74) *Attorney, Agent, or Firm* — Oblon, Spivak, McClelland, Maier & Neustadt, L.L.P.

(57) ABSTRACT

An optical projection device comprises an imaging device adapted to generate a first and a second image in a first and a second light beam, respectively, a first converting device that is adapted to convert a polarization state of one of the first and the second light beams into a converted polarization state, so that the first and the second light beams are in different polarization states, and a relay lens that is adapted to generate an intermediate image, by superimposing the first and the second images. The relay lens comprises a combining device, that is adapted to combine the first and the second light beams. The optical projection device further comprises a projection lens that is adapted to project the intermediate image onto a screen.

20 Claims, 5 Drawing Sheets

3D OPTICAL PROJECTION DEVICE

BACKGROUND

1. Field of the Invention

The present invention generally relates to a three-dimensional optical projection device.

2. Description of the Related Art

In the field of 3D imaging several projectors are known in which two images comprising the left image information and the right image information are projected onto a screen. For example, the two images may have orthogonal polarization states so that they are distinguishable for an observer. In particular, systems are known comprising two different projectors for the left and the right image, respectively. According to a different approach, a projector may comprise two imagers for the left and the right image, respectively, and a single projector for projecting a combined image onto a screen.

SUMMARY OF THE INVENTION

It is an object of the present invention to provide an optical projection device for generating a 3D image, that can be built in a compact manner. According to the present invention, the above objects are solved by the claimed matter according to the independent claims. The preferred embodiments are defined in the dependent claims.

BRIEF DESCRIPTION OF THE DRAWINGS

The accompanying drawings are included to provide a further understanding of embodiments of the invention and are incorporated in and constitute a part of this specification. The drawings illustrate the embodiments of the present invention and together with the description serve to explain the principles. Other embodiments of the invention and many of the intended advantages will be readily appreciated, as they become better understood by reference to the following detailed description. The elements of the drawings are not necessarily to scale relative to each other. Like reference numbers designate corresponding similar parts.

DETAILED DESCRIPTION OF THE INVENTION

In the following detailed description reference is made to the accompanying drawings, which form a part hereof and in which are illustrated by way of illustration specific embodiments in which the invention may be practiced. In this regard, directional terminology such as "top", "bottom", "front", "back", "leading", "trailing" etc. is used with reference to the orientation of the Figures being described. Since components of embodiments of the invention can be positioned in a number of different orientations, the directional terminology is used for purposes of illustration and is in no way limiting. Is to be understood that other embodiments may be utilized and structural or logical changes may be made without departing from the scope defined by the claims.

Figure 1:
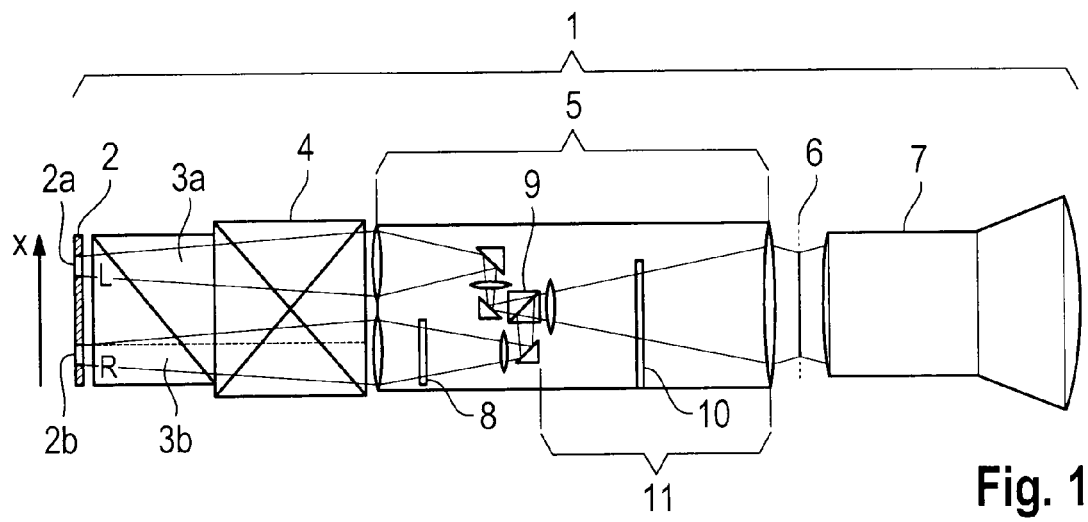
FIG. 1 shows a schematic drawing of an optical projection device according to an embodiment.

FIG. 1 shows an example of an optical projection device 1. As will be explained in the following, an optical projection device 1 may comprise an imaging device 2 that comprises a first image portion 2a and a second image portion 2b. The first and the second image portions 2a, 2b are adapted to generate a first and a second image in a first and a second light beam 3a, 3b, respectively. The optical projection device 1 further comprises a first converting device 8 that is adapted to convert a polarization state of one of the first and the second light beams 3a, 3b so that the first light beam is in a different polarization state than the second light beam. The optical projection device further comprises a relay lens 5 that is adapted to generate an intermediate image 6 by superimposing the first and the second images. For example, the first and the second images may be congruently superimposed. The relay lens 5 comprises a combining device 9 that is adapted to combine the first and the second light beams 3a, 3b. The optical projection device 1 further comprises a projection lens 7 that is adapted to project the intermediate image 6 onto a screen (not shown in this figure). Within the present specification reference to a "lens" is made. As is clearly to be understood, the term "lens" comprises any single lens or arrangement of lenses or other optical elements that are suitable for changing a light path in the described manner. Moreover, throughout the specification, the "first" and the "second" image or light beam is referred to. For example, the first image may relate to the left image and the second image may relate to the right image, i.e. the image that is perceived by the respective eye of an observer. Nevertheless, as is clearly to be understood, the term "first" and "second" image may as well refer to the right and the left image, respectively. Accordingly, the terms "first" and "second" light beam refer to the left and right or the right and left light beams.

When the optical projection device is operated, an incident light beam (not shown in this figure) may be directed onto the imaging device 2 that has different portions 2a, 2b for imaging the first and the second images, respectively. The light beams for imaging the first and the second images may be in the same polarization state and the converting device 8 may be disposed behind the imaging device 2. In this case, the polarization state of one of the two light beams is converted after forming the respective images. The imaging device 2 may be any known type of imager of a micro-display type projector, for example a reflective or transmissive liquid crystal display (LCD), a liquid crystal on silicon (LCoS) panel or it may be based on a micro electro-mechanical system (MEMS). As will be explained herein below with reference to FIG. 2, the projector may comprise three imaging devices for red, green and blue primary light, respectively. Alternatively, when the frame rate of the micro-display is fast enough, one micro-display may generate the primary color images time sequentially. In that case, the light source needs to illuminate the micro-display synchronously with red, green and blue illumination light, respectively. The converting device 8 may, for example, be a half wave retarder or a half wave plate as is generally known.

Generally, the area of the imaging device is split into two portions, one portion 2a generating the first image and the other portion 2b generating the second image. Optionally, a color combining device 4 may be disposed behind the imaging device so as to combine the images of the three primary colors, respectively. As mentioned above, the relay lens 5 is disposed behind the color combining device. The relay lens 5 comprises a combining device 9 that is adapted to combine the first and second light beams 3a, 3b. For example, the first and the second light beams may be in different linear polarization states (for example, p- and s-polarized) and the combining device 9 may be a polarization beam splitter. Accordingly, a combined light beam comprising the light beams in the two different polarization states is generated. The relay lens 5 may further comprise suitable imaging optics 11 so as to generate an intermediate image 6 from the superimposed sub-images. The imaging optics 11 may comprise suitable lenses. The relay lens may optionally further comprise a second converting device 10 that is adapted to convert the different linear polarization states into different elliptical polarization states. For example, the second converting device may be a quarter wave retarder or a quarter wave plate. For example, circularly polarized light may be generated by the second converting device. In this case, the 3D imaging works independently from the tilt of polarizer glasses of the observer. Behind the relay lens 5 an intermediate image 6 is generated. The intermediate image 6 comprises the superimposed first- and second images. Then, the intermediate image 6 is projected by the projection lens 7 onto a screen (not shown in this drawing). The optical projection device 1 may be operated with any kind of suitable illumination source having one or more suitable wavelengths. For example, an illumination source comprising a laser may be employed, the emitted laser light having a small divergence angle and, thus, a high F-number. Accordingly, the first and second light beam may be still separated before entering the relay lens 5. Hence, the first and second light beams may be properly distinguished.

Figure 2A:
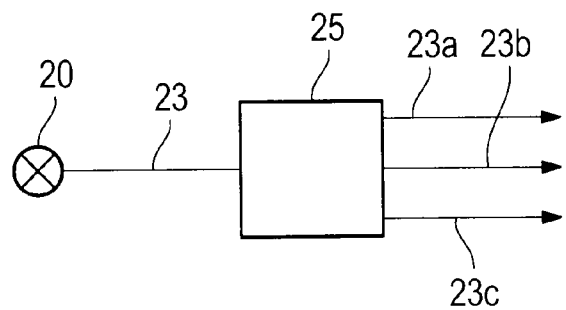
FIG. 2A shows an example of a color separation device.
Figure 2B:
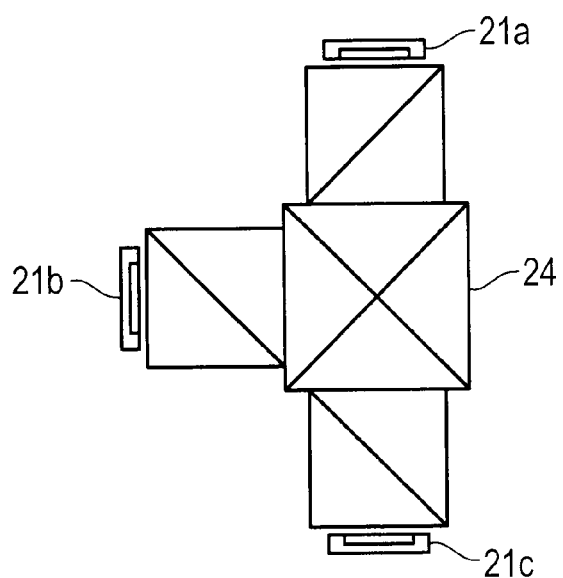
FIG. 2B shows an example of a color combining device.

FIGS. 2A and 2B show modifications of the device shown in FIG. 1. As is shown in FIG. 2A, white light 23 emitted from a suitable light source 20 may be separated into three primary colors 23a, 23b, 23c by means of a suitable color separation device 25. For example, the color separation device 25 may comprise various dichroic mirrors that are adapted to separate light having a specific color from a light beam comprising a mixture of different colors. Accordingly, for example, a red light beam 23a, a green light beam 23b and a blue light beam 23c may be generated. As is clearly to be understood, the light source 20 may also comprise different light generating devices that are adapted to generate light beams having the three different colors. For example, the light source 20 may comprise a red laser light source 20a, a green laser light source 20b and a blue laser light source 20c. Light having one of the three different primary colors is irradiated onto an imaging device 21a, 21b, 21c for the respective colors. Each of the imaging devices comprises a first and a second imaging portion and is adapted to generate a first and a second image from the incident light beam comprising a first and a second beam, respectively. A color combining device 24 combines three first light beams for the three different primary colors and the three second light beams for the three different primary colors. Then, the combined first light beam is irradiated on the relay lens 5, and the combined second light beam is irradiated on the relay lens 5 in the manner as has been explained above with reference to FIG. 1.

Figure 3A:
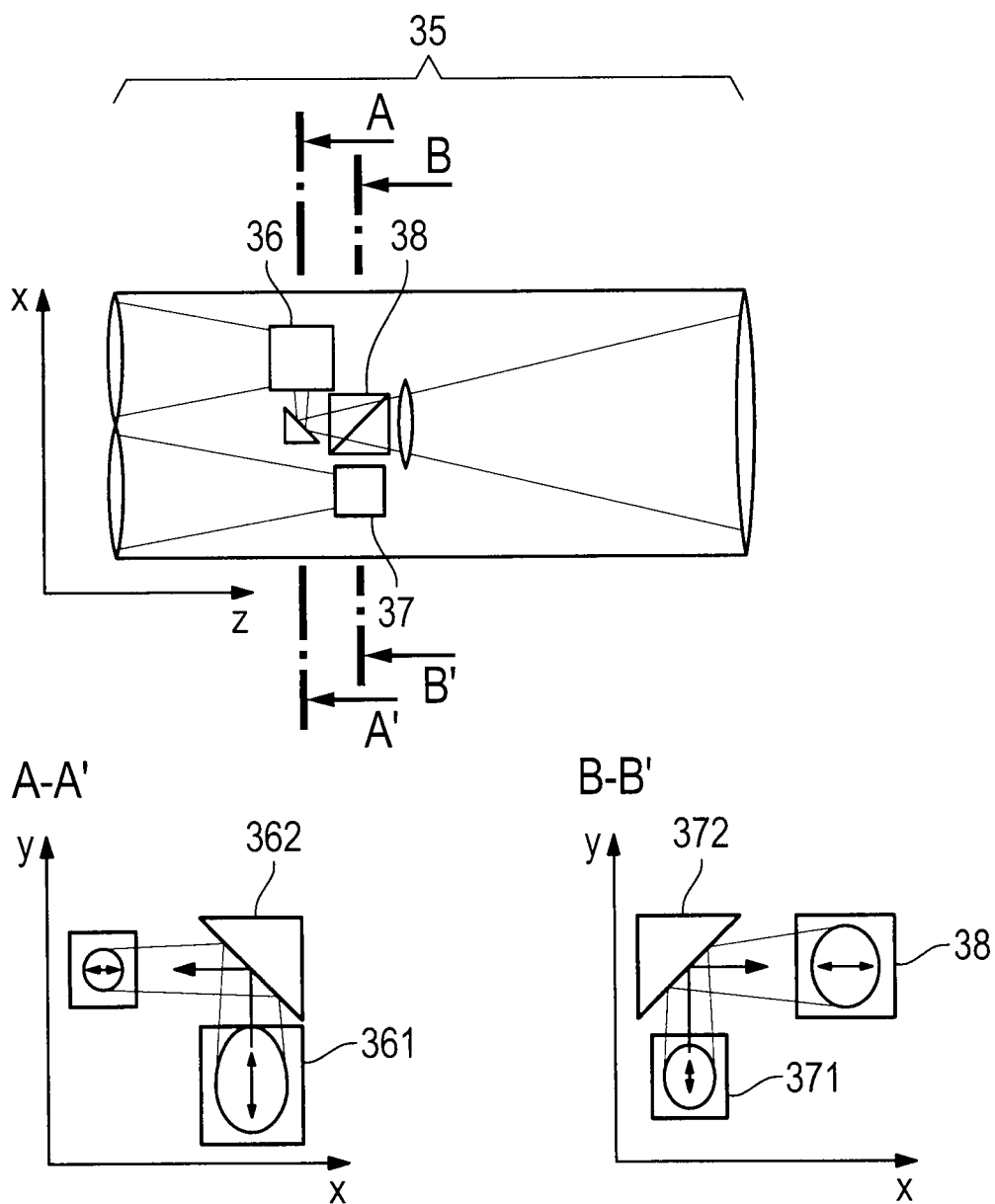
FIG. 3A shows an example of an element of the optical projection device according to an embodiment.

FIG. 3A shows a further embodiment. In the embodiment shown in FIG. 3A, the optical projection device comprises folding mirrors that are adapted to perform a three-axis folding along the local x-, y- and z-axis in order to flip the first and the second image by 90°.

Accordingly, as is shown in FIG. 3A a set of two folding mirrors 361, 362, 371, 372 may be placed into the light path of the second and first light beams, respectively, in order to flip the first and the second image by 90° along the z-axis. As is shown in the lower portion of FIG. 3A, the mirrors 361, 362 as well as the mirrors 371, 372 may be arranged along the y-direction. In FIG. 3A, reference numeral 38 denotes the polarization beam splitter.

Figure 3B:
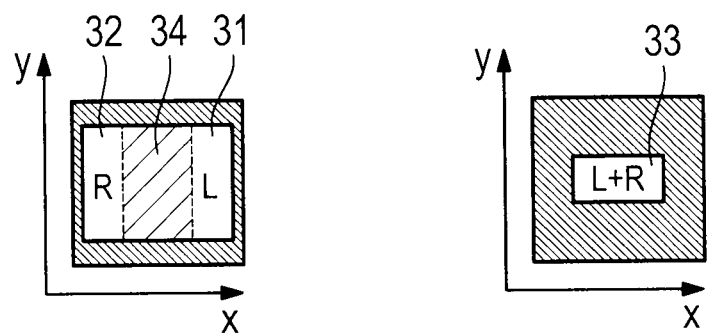
FIG. 3B shows an example of superimposing sub-images.

For example, the mirrors may be implemented by prisms or conventional mirrors. According to a further embodiment, the folding mirrors or prisms may have optical power, in order to improve the imaging quality of the relay lens or/and to reduce the number of lens elements. For example, the mirrors or prisms may have a convex or a concave surface. For example, the folding mirrors may form part of the relay lens 35. FIG. 3B shows superimposed images using the projection device comprising the folding mirrors. The long edge of the first and the second sub-images 31, 32 formed by the imaging device are oriented along the depth axis (y). When the sub-images are superimposed. the long edge of the image 33 is oriented along the horizontal axis (x). The left-hand portion of FIG. 3B shows the separated sub-images 31, 32 at the imaging device, the portion 34 separating the sub-images 31, 32.

Figure 4:
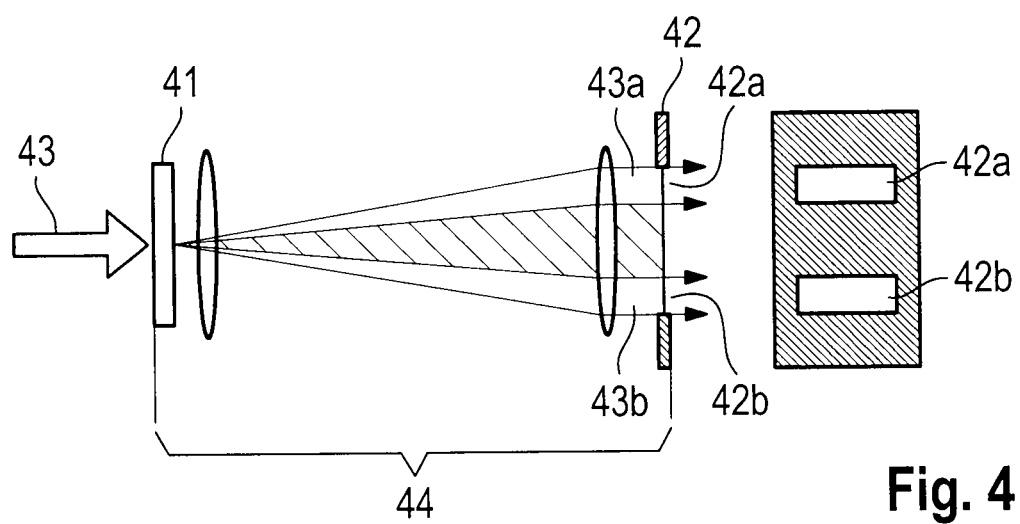
FIG. 4 shows an example of a further element of the optical projection device.

In conventional systems, the illumination optics usually illuminates the entire active area of the imaging device. Nevertheless, according to the embodiment shown in FIG. 1, it is sufficient to illuminate the portions 2a, 2b of the sub-images. Accordingly, a diffractive optical element may be used that is adapted to illuminate the sub-images only. Accordingly, losses of light may be avoided. FIG. 4 shows an arrangement 44 comprising a diffractive optical element 41 and further optical elements such as condenser and field lenses generating an illumination distribution, so that only the areas 42a, 42b of the imaging device 42 are illuminated with light. For example, the diffractive optical element 41 generates an illumination distribution comprising a first and a second light beam 43a, 43b from an incident laser beam 43. The first and the second beams 43a, 43b illuminate the respective portions 42a, 42b of the imaging device 42.

Figure 5:
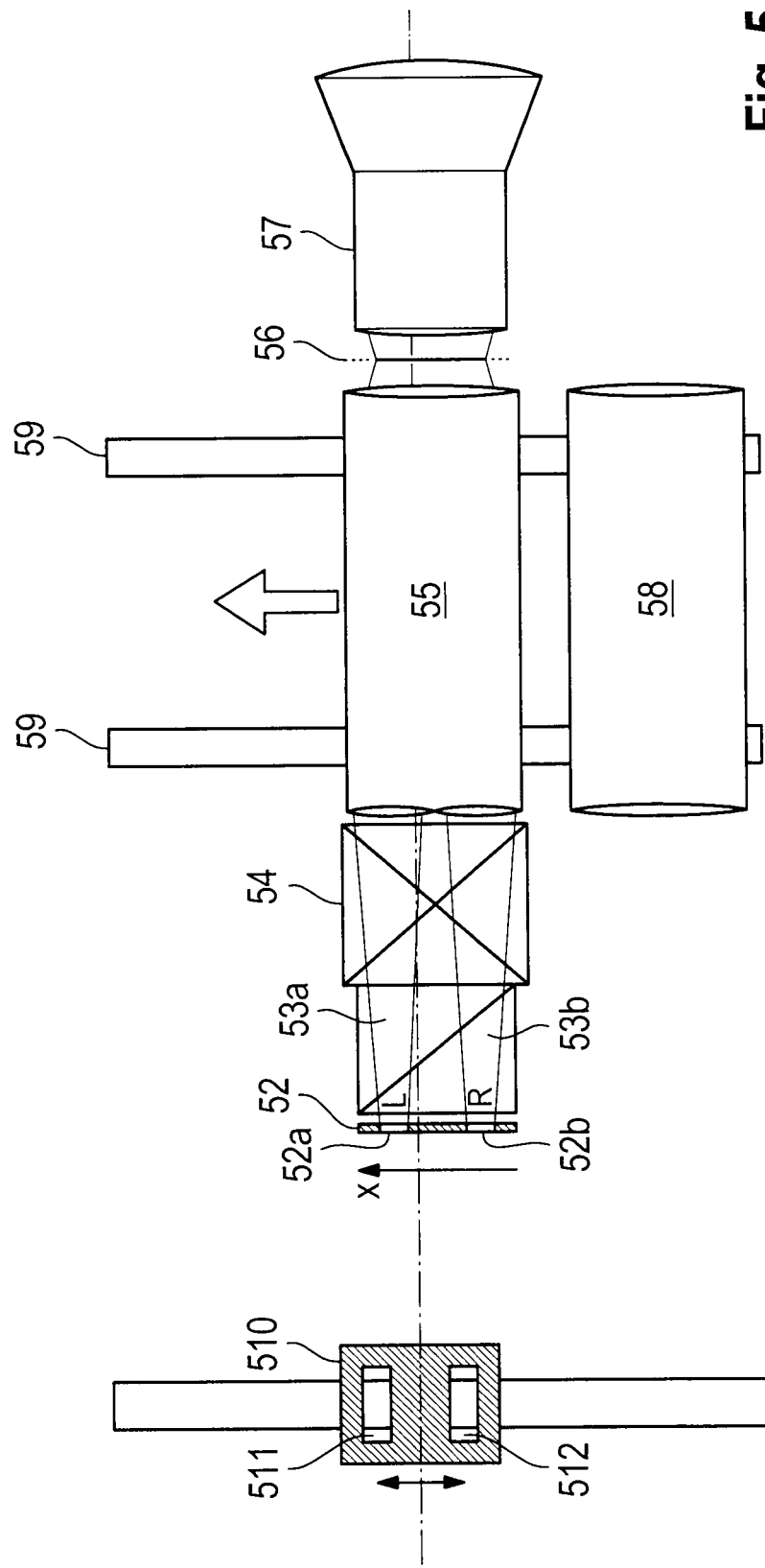
FIG. 5 shows an example of an optical projection device comprising two different relay lenses.

FIG. 5 shows a further embodiment of the optical projection device. The optical projection device comprises—like the optical projection device of FIG. 1—an imaging device 52. In a 3D mode, the imaging device is adapted to generate a first and a second image in a first and a second light beam 53a, 53b, respectively, wherein the first and the second light beams 53a, 53b are in the same polarization state. The imaging device 52 may comprise a first portion 52a and a second portion 52b. In a 2D mode, the imaging device 52 is adapted to generate a single image in a single light beam. The optical projection device further comprises a first relay lens 55 that is implemented in a manner as has been described above. The first relay lens 55 comprises a first converting device that is adapted to convert the polarization state of one of the first and the second light beams into a converted polarization state. Moreover, the first relay lens is adapted to generate an intermediate image 56 by superposing the first and the second images being in different polarization states. Accordingly, the first relay lens 55 operates in the 3D mode. The optical projection device further comprises a second relay lens 58 that is adapted to generate an intermediate image of the entire area of the imaging device 52. The second relay lens operates in a 2D mode. The first and the second relay lenses 55, 58 are mounted in the optical projection device in such a manner that they can be alternatively placed in a light path comprising the first and the second light beams. The optical projection device further comprises a projection lens 57 that is adapted to project the intermediate image 56 onto a screen (not shown in this drawing). For example, a system of rails 59 may be present in the optical projection system so as to move the first and the second relay lens in a simple manner. The first relay lens distinguishes between the first and the second images, the second relay lens generates an image of the entire imaging device 52. Accordingly, the second relay lens is adapted to project conventional 2D images with the full resolution of the first imaging device 52, whereas the first relay lens is adapted to project 3D images with reduced resolution of the first portion 52a and the second portion 52b. Hence, the optical projection device shown in FIG. 5 is adapted to toggle between 3D and 2D projection in an easy manner by moving the relay lenses 55, 58 along the rail. The relay lens 55 shown in FIG. 5 may be implemented in the manner as shown in FIGS. 1-4, respectively.

Moreover, in 3D mode a diffractive optical element 511 as has been explained above with reference to FIG. 4 may be disposed in front of the imaging device 52 in order to illuminate solely the two portions 52a and 52b of the imager panel 52. In 2D mode another diffractive optical element 512, which is adapted to illuminate the entire active area of the imaging device 52, may be disposed in front of the imaging device. Both diffractive elements 511, 512 may be mounted on a common holder 510. The holder 510 can be easily moved in order to toggle between 2D- and 3D mode.

Figure 6:
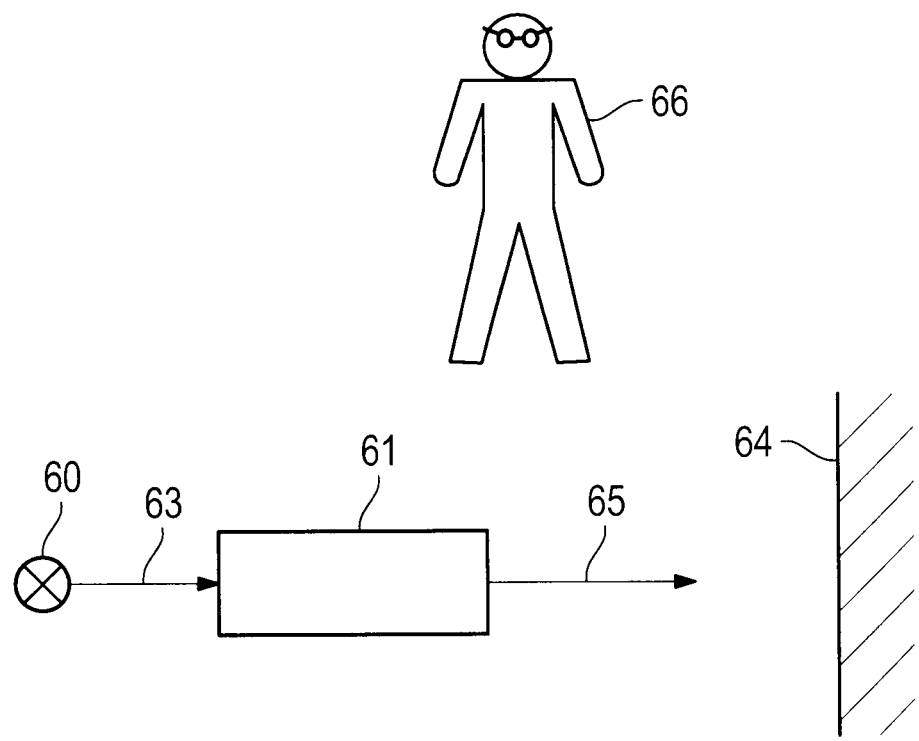
FIG. 6 shows a practical implementation of 3D imaging.

FIG. 6 shows a schematic view of a practical implementation of 3D imaging using the projection device as has been explained above. A light beam 63 from a suitable light source 60, for example a white light beam source, a light beam source comprising different light generating devices for generating light in the three primary colors, a laser light source and any other suitable lights source may be disposed in front of a projection device 61. The projection device may be any of the optical projection devices as has been described herein before. The projection device projects a combination of the first and second images onto a screen 64. When employed in the 3D mode, the projected image comprises distinguishable first images and second images. An observer 66 wears, for example, glasses that are adapted to distinguish between the different polarization states. For example, the glasses may comprise linear polarizers or linear polarizers in combination with a quarter-wave plate that is adapted to convert a linear polarization state into an elliptical polarization state and vice versa.

While embodiments of the invention have been described above, it is obvious that further embodiments may be implemented. Accordingly, this spirit and scope of the appended claims should not be limited to the description of the embodiments contained herein.

The invention claimed is:

1. An optical projection device, comprising:
an imaging device comprising a first image portion and a second image portion, the first and second image portions being adapted to generate a first and a second image in a first and a second light beam, respectively;
a first converting device that is adapted to convert a polarization state of one of the first and the second light beams into a converted polarization state, so that the first and the second light beams are in different polarization states;
a relay lens comprising a combining device, that is configured to combine the first and the second light beams to form a superimposed image, and imaging optics configured to generate an intermediate image from the superimposed image, and
a projection lens that is adapted to project the intermediate image onto a screen.

2. The optical projection device according to claim 1, wherein the first and the second light beams are in linear polarization states, and the combining device comprises a polarization beam splitter.

3. The optical projection device according to claim 2, wherein the relay lens further comprises a second converting device that is adapted to convert the different linear polarization states into different elliptical polarization states.

4. The optical projection device according to claim 1, wherein the first converting device is disposed behind the imaging device.

5. The optical projection device according to claim 1, further comprising a set of folding mirrors which are adapted to combine the first and second light beams into a common light beam.

6. The optical projection device according to claim 5, wherein the set of folding mirrors is further adapted to rotate the first and second image by 90° around the optical axis.

7. The optical projection device according to claim 6, wherein the folding mirror has optical power.

8. The optical projection device according to claim 1, further comprising a diffractive optical element that is disposed in front of the imaging device, the diffractive optical element being adapted to form a diffraction pattern of an incident light beam, the diffraction pattern being incident on the imaging device.

9. The optical projection device according to claim 1, wherein
the imaging device comprises imaging sub-devices that are adapted to generate a first, a second and a third image from a first, a second and a third light beam having different colors, respectively,
the optical projection device further comprising a color combining device that is adapted to combine the different colors into a combined light beam, the combined light beam comprising images of the respective colors, the combining device being disposed behind the imaging device.

10. An optical projection device, comprising:
an imaging device adapted to generate in a 3D mode a first and a second image in a first and a second light beam, respectively, the first and the second light beam being in the same polarization state, the imaging device further being adapted to generate in a 2D mode a single image in a single light beam;
a first relay lens operating in the 3D mode, comprising a first converting device that is adapted to convert the polarization state of one of the first and the second light beams into a converted polarization state, the first relay lens being adapted to generate an intermediate image by superimposing the first and the second images being in different polarization states;
a second relay lens operating in the 2D mode that is adapted to generate an intermediate image of the single image,
the first and the second relay lenses being mounted in the optical projection device in such a manner, so that they can be alternatively placed in a light path comprising the first and second light beams in the 3D mode or the single light beam in the 2D mode; and
a projection lens that is adapted to project the intermediate image onto a screen.

11. The optical projection device according to claim 10, wherein the first and the second light beams are in linear polarization states, and the combining device of the first relay lens comprises a polarization beam splitter.

12. The optical projection device according to claim 11, wherein the first relay lens further comprises a second converting device that is adapted to convert the different linear polarization states into different elliptical polarization states.

13. The optical projection device according to claim 10, wherein the first relay lens further comprises a set of folding mirrors which are adapted to flip the first and the second image from vertical into horizontal orientation.

14. The optical projection device according to claim 13, wherein the folding mirrors have optical power.

15. The optical projection device according to claim 10, further comprising a diffractive optical element that is disposed in front of the imaging device, the diffractive optical element being adapted to form a diffraction pattern of an incident light beam, which is illuminating an active area of a left and a right sub-image on the imaging device.

16. The optical projection device according to claim 10, further comprising:
 a color separation device that is adapted to separate an incoming light beam into different colors, the color separation device being disposed in front of the imaging device, and
 a color combining device that is adapted to combine the different colors into a combined light beam, the combined light beam comprising images of the respective colors, the combining device being disposed behind the imaging device.

17. The optical projection device according to claim 10, further comprising a diffractive optical element that is disposed in front of the imaging device, the diffractive optical element comprising a 2D mode diffractive optical element, the 2D mode diffractive optical element being adapted to form a diffraction pattern of an incident light beam, which is illuminating an active area of the entire imaging device, and
 a 3D mode diffractive optical element, the 3D mode diffractive optical element being adapted to form a diffraction pattern of an incident light beam, which is illuminating an active area of a left and a right sub-image on the imaging device.

18. The optical projection device according to claim 17, wherein the 2D mode diffractive optical element and the 3D diffractive optical element are mechanically moveable in order to easily switch between 2D and 3D mode.

19. An optical projection device, comprising:
 an imaging device adapted to generate a first and a second image;
 a relay lens comprising a combining device that is configured to combine the first and the second light beams to form a superimposed image, and imaging optics configured to generate an intermediate image from the superimposed image in a manner so that the first and the second image are distinguishable; and
 a projection lens that is adapted to project the intermediate image onto a screen.

20. The optical projection device according to claim 19, wherein the first and the second images are formed by light beams being in different polarization states.

* * * * *